United States Patent [19]
Agari

[11] Patent Number: 5,388,912
[45] Date of Patent: Feb. 14, 1995

[54] LINEAR MOTION ROLLING GUIDE UNIT
[75] Inventor: Norimasa Agari, Seki, Japan
[73] Assignee: Nippon Thompson Co., Ltd., Tokyo, Japan
[21] Appl. No.: 165,893
[22] Filed: Dec. 14, 1993
[30] Foreign Application Priority Data
Dec. 17, 1992 [JP] Japan .............................. 4-091496[U]
[51] Int. Cl.⁶ .............................................. F16C 29/06
[52] U.S. Cl. ......................................... 384/15; 384/45
[58] Field of Search ....................... 384/15, 45, 16, 43, 384/44

[56] References Cited
U.S. PATENT DOCUMENTS 5,087,130  2/1992  Tsukada ............................... 384/15
5,209,575  5/1993  Ohtake ................................ 384/15

FOREIGN PATENT DOCUMENTS 3-98321  10/1991  Japan .
3-1220   12/1991  Japan .
3-118317 12/1991  Japan .
5-4128    6/1993  Japan .

*Primary Examiner*—Lenard A. Footland
*Attorney, Agent, or Firm*—Browdy and Neimark

[57] ABSTRACT

The linear motion rolling guide unit according to this invention enables the under seals to be mounted to the end caps easily without being deformed as by buckling or without requiring high-precision machining. The under seal is provided, at its longitudinal ends, with locking bands that engage with engagement grooves formed in the end caps. Mounting and dismounting the under seal to and from the end caps are accomplished by expanding the locking bands in the longitudinal direction of the under seal. The under seal is allowed to undergo longitudinal and lateral deformations with respect to the end caps, which deformations caused by external force, thermal expansion and swelling. This construction prevents deformation of the under seal such as caused by buckling and improves the sealing performance.

4 Claims, 3 Drawing Sheets

LINEAR MOTION ROLLING GUIDE UNIT

BACKGROUND OF THE INVENTION

1. Field of the Invention

The present invention relates to a linear motion rolling guide unit, which is applied to a variety of relatively sliding portions in machine tools and testing equipment and in which a slider is mounted slidable on a track rail with rolling elements interposed therebetween.

2. Description of the Prior Art

In conventional linear motion rolling guide units, the sealing between a track rail and a slider that slides on it is realized by end seals attached to the ends of the slider and under seals attached to the underside of the slider.

A linear motion rolling guide unit as shown in FIG. 6 has been known. FIG. 6 shows a perspective view of one example of a conventional linear motion rolling guide unit. As shown in the figure, the linear motion rolling guide unit includes as main components a track rail 1 having raceway grooves 17 extending longitudinally on both side wall surfaces 18 thereof, and a slider 20 slidably mounted astride on the track rail 1. The slider 20 has a casing 2, which is slidable relative to the track rail 1 and has raceway grooves 16 formed at positions facing the raceway grooves 17 on the track rail 1, a number of rolling elements 4 trapped between the opposing raceway grooves 16 and 17, and end caps 25 attached to the longitudinal ends of the casing 2, the longitudinal direction being the sliding direction of the casing 2.

The end cap 25 has an end seal 19 attached to the end surface thereof that provides the sealing between the track rail 1 and the slider 20. The casing 2 is provided with under seals 3 for sealing the undersides of the casing 2 and end caps 25 and the longitudinal side wall surfaces 18 of the track rail 1. The slider 20 is mounted astride on the track rail 1 and freely slidable relative to it through a number of rolling elements 4 circulating along the raceway grooves 17 in the track rail 1. The rolling elements 4 circulate through raceways formed between the opposing raceway grooves 16 and 17, through direction changing passages formed in the end caps 25 and through return passages 24 formed in the casing 2.

Mounting and dismounting the under seal 3 to and from the casing 2 is not easy because it uses fastening means such as screws. The under seal 3, though it has an advantage of being simple in construction and easily manufactured, also has drawbacks that because the under seal 3 is thin, it is easily deformed by external forces and by positional errors between it and the casing 2 and track rail 1, the casing and track rail having the raceway grooves 16, 17 respectively. Hence, the under seal 3, which is subjected to temperature variations and exposed to lubricants as the slider 20 slides on the track rail 1, might swell and be deformed deteriorating the sealing performance.

There has been known a dust prevention device for linear guide equipment such as disclosed in the Japanese Utility Model No. 98321/1991. In this dust prevention structure for the linear motion bearing apparatus, the axial ends of an under seal are bent inwardly to shape it like a letter U; the inner surfaces of the bent portions of the under seal are provided with engagement projections protruding inwardly; and the outer end surfaces of the end caps are formed with recesses to receive the engagement projections of the under seal.

In an under seal apparatus for a linear motion guide bearing disclosed in the Japanese Utility Model 118317/1991, axial ends of the under seal are formed with axially extending projections and end seals are formed at their bottom end surfaces with engagement holes for receiving the projections of the under seal, whereby the under seal is fitted into the end seals having a greater strength to make mounting and dismounting easy and secure a sufficient strength.

In another under seal apparatus for a linear motion guide bearing disclosed in the Japanese Utility Model 121220/1991, the axial ends of the under seal are provided with two-pronged projections protruding toward the underside of the slider, the two prongs diverging in a V-shape and being elastically deformable toward each other. The slider has the axial end portions of the underside thereof formed With vertical holes, into which the two-pronged projections of the under seal are fitted, and also with through-holes that intersect the vertical holes perpendicularly and pass through the arm or wing portions of the slider. One of the two prongs fitted into the vertical hole is elastically deformed therein, urging the under seal toward the side surface of the guide rail to bring the side edge of the under seal into sliding contact with the guide rail.

In these under seal apparatuses for the linear motion guide bearings, the under seal is mounted by engaging the projections or prongs formed on the under seal into the engagement holes formed in the slider or end seals.

The conventional linear motion rolling guide units, however, uses different materials for the dust prevention member and the slider, so that they have different thermal expansions as temperature changes. When the thermal expansion of the dust prevention member becomes larger than that of the slider, the dust prevention member will be deflected creating a gap between it and the guide rail or the underside of the casing, with the result that the sealing performance deteriorates, unable to prevent ingress of dust.

The applicant of this invention developed a linear motion rolling guide unit that solved the above-mentioned problem, and applied for patent previously (Japanese Patent Laid-Open No. 164128/1993). In this linear motion rolling guide unit, the under seal has a lip portion sealingly engageable with the undersides of the casing and the end caps and another lip portion sealingly engageable with the side wall surface of the track rail. The under seal is also formed at the longitudinal ends with locking portions, which are fitted into engagement holes formed in the end seals to mount the under seal to the end seals.

In the conventional linear motion rolling guide unit, since the longitudinal ends of the under seal are engaged in the engagement holes formed in the end caps or end seals to mount the under seal to the end seals, there must be some play for the under seal to move relative to the undersides of the casing and end caps so that the longitudinal elongation of the under seal due to thermal expansion difference can be offset by the engagement holes in the end caps or end seals. Otherwise, the under seal would be deformed as by buckling, degrading the sealing performance.

The conventional linear motion rolling guide unit, however, has the construction in which the projections of the under seal are engaged in the engagement holes in the end caps or end seals in such a way that they cannot move in the longitudinal direction. Further, since the under seal adheres to the undersides of the casing and end caps, the under seal cannot move. This structure, though it may facilitate the mounting and dismounting of the under seal, may not necessarily be able to position the under seal correctly and also has a problem that the under seal will be deformed by temperature variations and by swelling due to exposure to lubricants, deteriorating the sealing performance.

SUMMARY OF THE INVENTION

A major objective of the present invention is to overcome the above-mentioned drawbacks and to provide a linear motion rolling guide unit, which, to mount to the end caps the under seals for sealing between the track rail, the casing and the end caps, has the construction wherein the under seals comprise a core member and lip portions secured to the core member and wherein locking bands are protruded from the ends of the core member and engaged in engagement grooves formed in lower portions of outer side walls of the end caps so that changes in longitudinal and lateral lengths of the under seal, i.e. deformations caused by swelling due to exposure to lubricants or by thermal expansion difference, can be tolerated. This construction prevents distortions or deformations such as buckling that would otherwise be caused by thermal expansion differences as the temperature changes and by swelling due to exposure to lubricants. It also ensures good sealing performance and permits easy mounting and dismounting of the under seals.

Another object of this invention is to provide a linear motion rolling guide unit, which comprises:
a track rail having raceway grooves formed on longitudinally extending side wall surfaces thereof;
a casing slidable relative to the track rail and having raceway grooves formed at positions facing the first raceway grooves on the track rail;
end caps mounted to the longitudinal ends of the casing;
rolling elements circulating through raceways formed between the opposing raceway grooves; and
under seals including seal members for sealing between the casing and the track rail and core members secured to the seal members;
wherein the under seals have locking bands extending laterally outwardly from the longitudinal ends of each core member and locking detents formed by bending the free ends of the locking bands toward the end caps; and
wherein the end caps are formed, on one of their sides opposite to the casing, with engagement grooves for receiving the locking bands of the under seals and with locking grooves for receiving the locking detents.

The locking bands of the under seal have elasticity that allows the locking detents to elastically engage in the locking grooves; the locking bands of the under seal are formed in a curve so that they can be elastically elongated or contracted widthwise; and the elastic seal member of the under seal are formed with a bulge that bears on the undersides of the end caps when the under seal is mounted to the end caps.

With the locking bands expanded against their elastic force, the under seal is put against the undersides of the end caps and the locking bands are released to snap back to their original condition to engage in the engagement grooves causing the locking detents at their ends to fit into the locking grooves. With this simple procedure, the under seal can be mounted easily to the correct position on the end caps, requiring no other fixing means. Further, dismounting the under seal from the end caps can be achieved by a simple operation of expanding the locking bands against their elastic force.

During the process of being mounted onto the end caps, the under seal is restricted and positioned in the longitudinal and vertical directions by the engagement between the engagement grooves and the locking bands. The under seal is also positioned in the lateral direction by the engagement between the locking grooves in the end caps and the locking detents of the under seal.

When the slider having the under seals attached to its end caps is mounted on the track rail, the lip portions formed on the elastic seal members of the under seals come into contact with the track rail and are deformed so that the lip portions can move in sliding contact, under preloaded condition, with the longitudinally extending side wall surfaces of the track rail, thereby providing a good seal between them. The elastic members of the under seals are also in a preloaded contact with the undersides of the end caps and the casing to seal them.

Because the under seal is supported on the end caps by the locking bands extending laterally outwardly from the longitudinal ends of the under seal and by the locking detents formed at the free ends of the locking bands, any longitudinal elongation of the under seal caused by swelling due to exposure to lubricants or by thermal expansion difference resulting from temperature variations can be offset by elastic deformation of the locking bands, thus preventing the under seal from being strained, deformed or buckled and maintaining the good sealing performance.

If the locking bands are formed in a curve to have elasticity, fitting the locking detents formed at the ends of the locking bands into the locking grooves in the end caps causes the locking bands with the curved portions to be elastically deformed by the pressure applied to the lip portion of the elastic member engaging the side wall surface of the track rail. In other words, the locking bands are preloaded.

Hence, if the lip portion is worn out from the sliding contact with the longitudinal sidewall surfaces of the track rail over a long period of use, it is pressed against the track rail by the preloaded under seal that offsets the wear to make proper adjustment for the wear so that the lip portion can always provide a good sealing to the track rail.

The elastic member of the under seal has a bulge on its upper surface that bears on the undersides of the end caps when the under seal is mounted to the end caps. Hence, the elastic force of the bulge causes the locking bands of the under seal to be pressed against the bottom side of the engagement grooves in the end caps, fastening the under seal to the end Gaps and reliably positioning it.

Another notable aspect of the mounting structure of the under seal and the end caps is that the under seal is almost accommodated in undercut portions of the lower part of the end Gaps. Since the locking bands, which extend in almost the same plane as the elastic member of the under seal, are fitted in the engagement grooves in the end caps, there are no projecting portions protruding toward the bed on which the rail is laid, securing a sufficient gap between the under side of the slider and the opposing bed, which in turn enhances the freedom of design of the linear motion rolling guide unit.

BRIEF DESCRIPTION OF THE DRAWINGS

FIG. 1 is a schematic front view showing a part the linear motion rolling guide unit as one embodiment of the present invention;

FIG. 2 is a bottom view showing a part of the linear motion rolling guide unit of FIG. 1;

DETAILED DESCRIPTION OF THE EMBODIMENT

Figure 3:
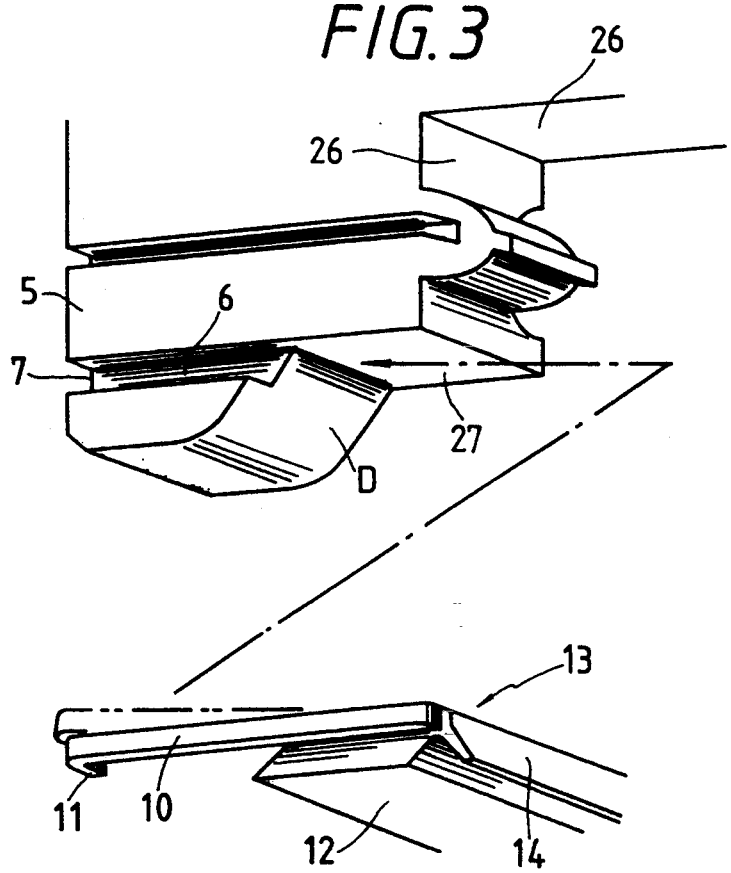
FIG. 3 is an exploded perspective view of the end cap and the under seal in the linear motion rolling guide unit of FIG. 1.

Now, one embodiment of the linear motion rolling guide unit according to this invention will be described by referring to FIGS. 1, 2 and 3. In these figures components having the same functions or actions as those in FIG. 6 are assigned like reference numerals.

Figure 6:
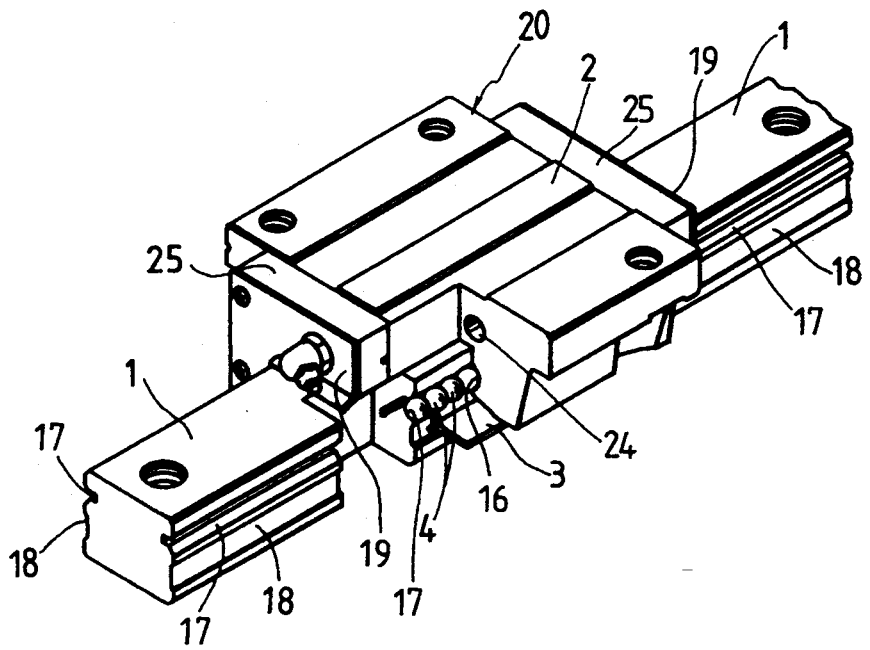
FIG. 6 is a perspective view of one example of a conventional linear motion rolling guide unit.

The linear motion rolling guide unit of this invention is basically the same in construction as the linear motion rolling guide unit of FIG. 6 and is characterized in the mounting structure of the under seal 13 mounted to the end cap 5. That is, like the construction shown in FIG. 6, the linear motion rolling guide unit of this invention comprises: a track rail 1 having raceway grooves 17 extending longitudinally on both side wall surfaces 18 thereof; a casing 2 slidable relative to the track rail 1 and having raceway grooves 16 at positions facing the raceway grooves 17; a number of rolling elements 4 circulating through raceways formed between the opposing raceway grooves 16 and 17; end caps 5 attached to the longitudinal ends of the casing 2; end seals 19 attached to the end surfaces of the end caps 5; and under seals 13 mounted to the end caps 5.

The end caps 5 are mounted to the end surfaces of the casing 2 by passing two or more screws through mounting holes formed therein. The inside of the end cap 5 is formed with direction changing passages on both sides for changing the direction of travel of the rolling elements 4 so that they can circulate endlessly in the raceways between the casing 2 and the track rail 1. The end cap 5 is formed with a rail accommodating recess 26 through which it straddles the track rail 1. The lower part of the end cap 5 is cut halfway on the track rail side to form an inclined engagement surface D at around the center against which an elastic member 12 of the under seal 13 bears.

In this linear motion rolling guide unit, the under seal 13 comprises a core member 9 made of such metallic materials as steel and an elastic member 12 made of such elastic materials as rubber and plastics secured to the core member. The core member 9 has at its longitudinal ends locking bands 10 extending laterally outwardly, whose free ends are bent inwardly toward the end caps 5 to form locking detents 11. The lateral cross section of the elastic member 12 is so sized that it can be accommodated in a notched portion 27 at the lower part of the end caps 5. The elastic member 12 is formed with a lip portion 14 one side and a tilted portion 21 on the other. The lip portion 14 engages with the longitudinally extending side wall surface 18 of the track rail 1, while the tilted portion 21 bears on the tilted surface, or the engagement surface D, of the end caps 5. The under seal 13 is constructed so that the locking bands 10 of the core member 9 extend laterally outwardly at the longitudinal ends of the elastic member 12 on the same plane as the elastic member 12.

On the side opposite to the casing 2, the end caps 5 have their lower portions formed with engagement grooves 6 for receiving the locking bands 10 of the under seal 13 and with locking grooves 7 for receiving the locking detents 11. The engagement grooves 6 are formed horizontal in the width direction of the end caps 5, and the locking grooves 7 are formed at, or on the way to, the end of the engagement grooves 6 which is away from the track rail 3. In other words, the locking grooves 7 may be formed either as grooves at the outer end surfaces of the end caps 5 or as holes in the engagement grooves 6.

In this linear motion rolling guide unit, the locking band 10 of the under seal 13 have elasticity that allows the locking detents 11 to resiliently engage with the locking grooves 7. Because the under seal 13 is supported on the end caps 5 by the locking bands 10 extending laterally outwardly at the longitudinal ends of the under seal and by the locking detents 11 formed at the free ends of the locking bands 10, any longitudinal elongation of the under seal 13 caused by swelling due to exposure to lubricants or by thermal expansion resulting from temperature variations can be offset by elastic deformation of the locking bands 10, thus preventing deformation or buckling of the under seal 13 and maintaining the sealing performance.

Mounting the under seal 13 to the end caps 5 involves the steps of: engaging the under seal 13 against the undersides of the end caps 5 with the locking bands 10 of the under seal 13 extended against their elastic force; fitting the locking bands 10 into the engagement grooves 6 that are formed in the lower part of the end caps 5 on the side opposite to the casing 2; then fitting the locking detents 11 formed at the free ends of the locking bands 10 into the locking grooves 7 formed at the end of the engagement grooves 6. In this way the under seal 13 can easily be mounted to the end caps 5.

With the under seal 13 mounted to the end caps 5, the under seal 5 is restricted and positioned in the longitudinal and vertical directions by the engagement between the engagement grooves 6 and the locking bands 10. Further, the engagement between the locking detents 11 and the locking grooves 7 formed at the ends of the engagement grooves 6 causes the tilted portion 21 of the elastic member 12 of the under seal 13 to bear on the engagement surface D of the lower part of the end caps 5, thereby restricting the lateral position of the under seal 13.

Next, by referring to FIG. 4, another embodiment of the linear motion rolling guide unit according to this invention will be described. In this embodiment, the locking bands 10 of the under seal 13 are curved so that they can be elastically elongated or contracted in the lateral direction. If the locking bands 10 are formed with curved portions to exhibit elasticity, fitting the locking detects 11 formed at the ends of the locking bands 10 into the locking grooves 8 in the end caps 5 causes the locking bands 10 with the curved portions to be elastically deformed by the pressure applied to the lip portion 14 of the elastic member 12 engaging the side wall surface 18 of the track rail 1. In other words, the locking bands 10 are preloaded. Hence, if the lip portion 14 of the under seal 13 is worn out, it is pressed against the track rail 1 by the preloaded under seal 13 that offsets the wear to make proper adjustment for the wear so that the lip portion 14 can always provide a good sealing to the track rail 1.

Figure 4:
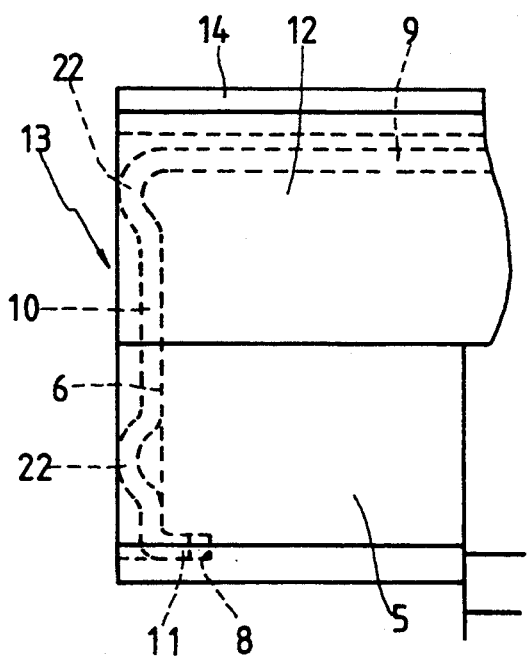
FIG. 4 is a bottom view showing a part of the linear motion rolling guide unit as another embodiment of this invention.
Figure 3:
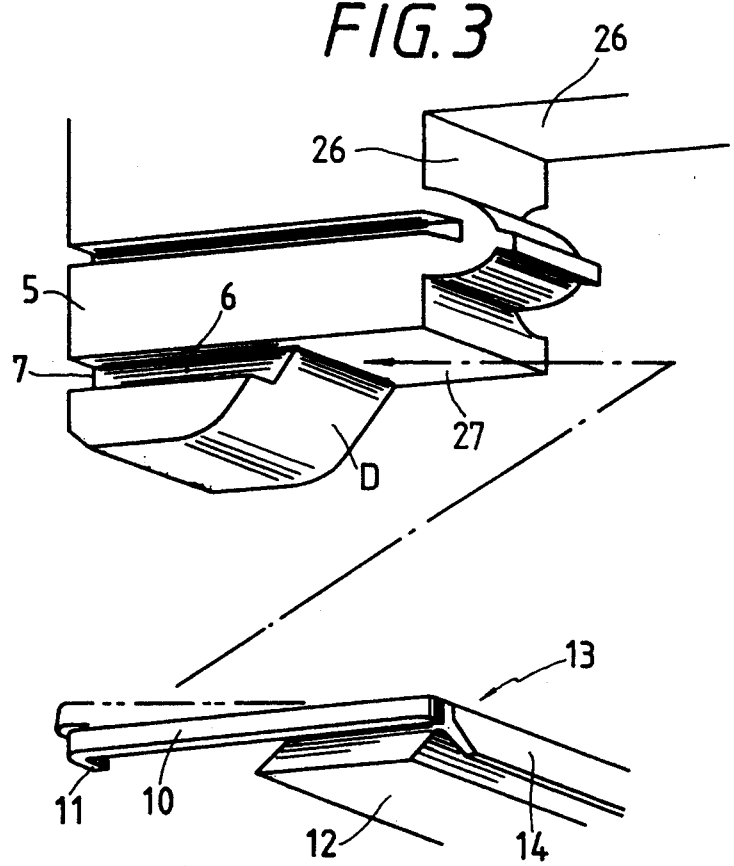
Figure 4:
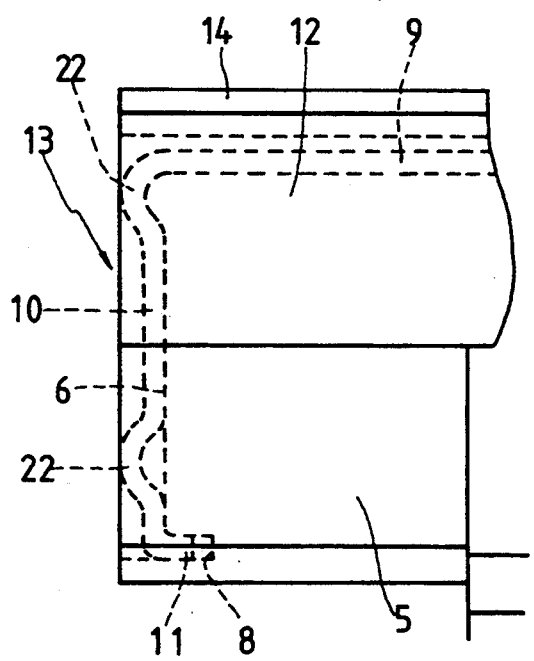

While in FIG. 4 the locking bands 10 of the under seal 13 are shown to be curved like a bow, they may be formed like a wave. The lip portion 14 that is in sliding contact with the longitudinal side wall surface 18 of the track rail 1 will be worn out over many years of use. The under seal 13 is pressed against the engagement surface D of the end caps 5 with the locking detents 11 of the locking bands 10 engaged in the locking grooves 8, so that the curved portions 22 of the locking bands 10 are elastically deformed. The locking grooves 8 may be formed as notches by cutting outer surface of the end caps 5 or as holes formed in the engagement holes 6. When the lip portion 14 of the under seal 13 is worn out, the curved portions 22 of the locking bands 10 work as an automatic wear adjusting means by advancing the under seal 13 toward the track rail 1 to offset the wear of the lip portion 14.

Figure 5:
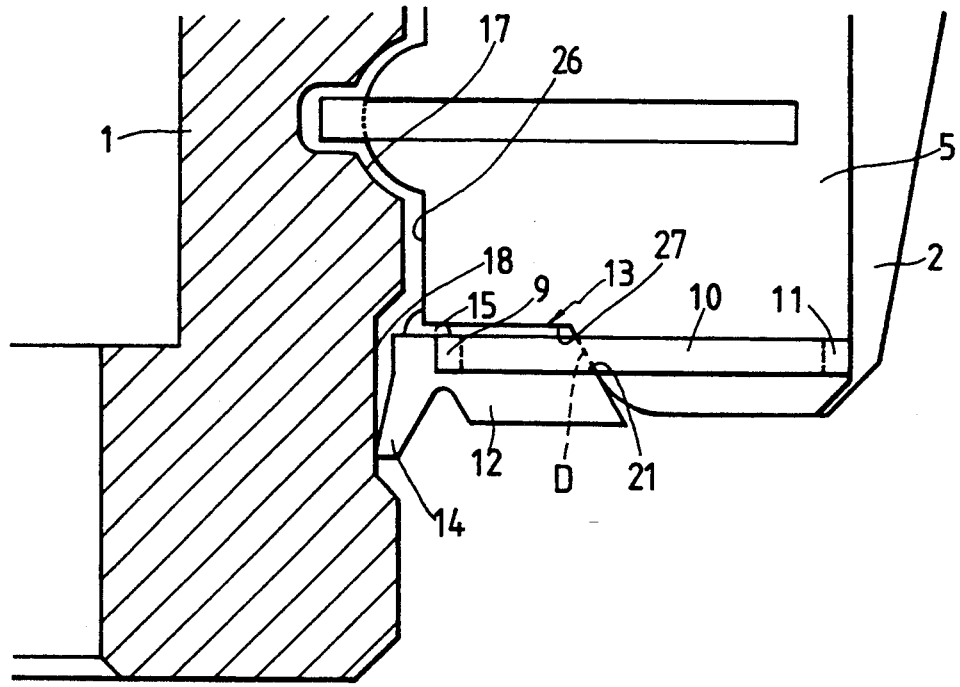
FIG. 5 is a front view showing a part of the linear motion rolling guide unit as still another embodiment of this invention.

Next, by referring to FIG. 5 still another embodiment of the linear motion rolling guide unit according to this invention will be described. In this embodiment, the elastic member 12 of the under seal 13 has a bulge 15 that bears on the undersides of the end caps 5 when the under seal 13 is mounted to the end caps 5. Hence, the elastic force of the bulge 15 causes the locking bands 10 of the under seal 13 to be pressed against the bottom side of the engagement grooves 6 in the end caps 5, fastening the under seal 13 to the end caps 5 and reliably positioning it. Further, since the bulge 15 is formed over the entire longitudinal length of the under sell 13, it bears on the undersides of the end caps 5 and casing 2, working as an additional sealing means and improving the sealing performance of the under seal 13.

An engagement portion 21 of the elastic member 12 of the under seal 13 that bears against the engagement surface D of the lower portion of the end caps 5 is formed into a shape that conforms to that of the engagement surface D. It is noted, however, that the engagement surface D of the lower portion of the end caps 5 is not limited to the inclined surface shown but may be formed as a vertical surface perpendicular to the underside of the end caps 5 or may be inclined in a direction opposite to that shown in the figure.

In the aforementioned embodiments, the under seal 13 has its locking bands 10 of the core member 9 extending horizontally in almost the same plane as the elastic member 12. The locking bands 10 may extend in an inclined direction. For the lip portion 14 of the elastic member 12 of the under seal 13 to be able to be adjusted for wear, it is preferred that the locking bands 10 be constructed so that when released from their own preloaded force, they can slide and extend toward the track rail 1.

I claim:

1. A linear motion rolling guide unit comprising:
a track rail having first raceway grooves formed on longitudinally extending side wall surfaces thereof;
a casing slidable relative to the track rail and having second raceway grooves formed at positions facing the first raceway grooves;
end caps mounted to the longitudinal ends of the casing;
rolling elements circulating through raceways formed between the first raceway grooves and the second raceway grooves; and,
under seals arranged on the undersides of the casing and the end caps, the under seals including elastic seal members for sealing the casing, the end caps and the track rail and core members secured to the elastic seal members;
wherein the under seals have locking bands extending laterally outwardly from the longitudinal ends of each core member and locking detents formed by bending the free ends of the locking bands toward the end caps; and
wherein the end caps are formed, at their lower portion on the side opposite the casing, with longitudinally extending engagement grooves and with locking grooves formed at the outer ends of the engagement grooves, and the locking bands and the locking detents of the under seals are fitted into the engagement grooves and the locking grooves, respectively.

2. A linear motion rolling guide unit according to claim 1, wherein the locking bands of the under seals have elasticity that allows the locking detents to elastically engage with the locking grooves.

3. A linear motion rolling guide unit according to claim 1, wherein the locking bands of the under seals are formed in a curved shape so that they can be elastically elongated or contracted in the lateral direction of the end caps.

4. A linear motion rolling guide unit according to claim 1, wherein the elastic seal members of the under seals have a bulge that bears on the undersides of the end caps when the under seals are mounted to the end caps.

* * * * *